(12) United States Patent  
Davies

(10) Patent No.: US 8,372,181 B2  
(45) Date of Patent: Feb. 12, 2013

(54) PLEATED WALLED BAG FILTERS FOR GAS TURBINE INLET SYSTEMS

(75) Inventor: John Carl Davies, Portsmouth (GB)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 12/831,290

(22) Filed: Jul. 7, 2010

(65) Prior Publication Data

US 2012/0005997 A1    Jan. 12, 2012

(51) Int. Cl.
*B01D 46/00* (2006.01)

(52) U.S. Cl. .............. 95/273; 55/381; 55/484; 55/521

(58) Field of Classification Search ........... 55/484, 55/432, 491, 497, 498, 502, 521, 529, 482, 55/495, 499, 500, 501, DIG. 5, DIG. 12, 55/DIG. 31, 378, 361, 368, 379, 382, DIG. 2; 95/92, 210; 210/493.1–493.5; 264/DIG. 48
See application file for complete search history.

(56) References Cited

U.S. PATENT DOCUMENTS

| | | | | |
|---|---|---|---|---|
| 3,807,147 A | * | 4/1974 | Schoonen et al. | 55/368 |
| 3,830,042 A | * | 8/1974 | MacDonnell | 55/341.4 |
| 4,072,484 A | * | 2/1978 | Carre et al. | 55/379 |
| 4,187,091 A | * | 2/1980 | Durre et al. | 55/499 |
| 4,746,339 A | * | 5/1988 | Millard | 55/302 |
| 5,554,203 A | * | 9/1996 | Borkent et al. | 55/378 |
| 5,914,413 A | * | 6/1999 | Andersson et al. | 55/378 |
| 6,524,359 B1 | * | 2/2003 | Kluge | 55/378 |
| 6,875,256 B2 | | 4/2005 | Gillingham et al. | |
| 7,931,723 B2 | * | 4/2011 | Cuvelier | 55/484 |
| 7,931,726 B2 | * | 4/2011 | Karlsson et al. | 55/521 |
| 7,938,927 B2 | * | 5/2011 | Sundvik et al. | 156/196 |
| 7,947,101 B2 | * | 5/2011 | Devine et al. | 55/484 |
| 2002/0121077 A1 | * | 9/2002 | Kim et al. | 55/385.1 |
| 2004/0163372 A1 | * | 8/2004 | Nguyen | 55/497 |
| 2011/0061353 A1 | * | 3/2011 | Fischer | 55/498 |
| 2012/0090286 A1 | * | 4/2012 | Fujii et al. | 55/498 |

* cited by examiner

*Primary Examiner* — Duane Smith
*Assistant Examiner* — Minh-Chau Pham
(74) *Attorney, Agent, or Firm* — Cooper Legal Group, LLC

(57) ABSTRACT

A filter bag assembly and an associated method. The assembly has a filter bag that includes at least two sidewalls of filter material spaced from each other at an open end and connected to provide a closed end of the filter bag assembly. At least one of the sidewalls includes at least one folded pleat. In one specific example, the folded pleat extends perpendicular relative to a direction extending from the open end to the closed end.

18 Claims, 2 Drawing Sheets

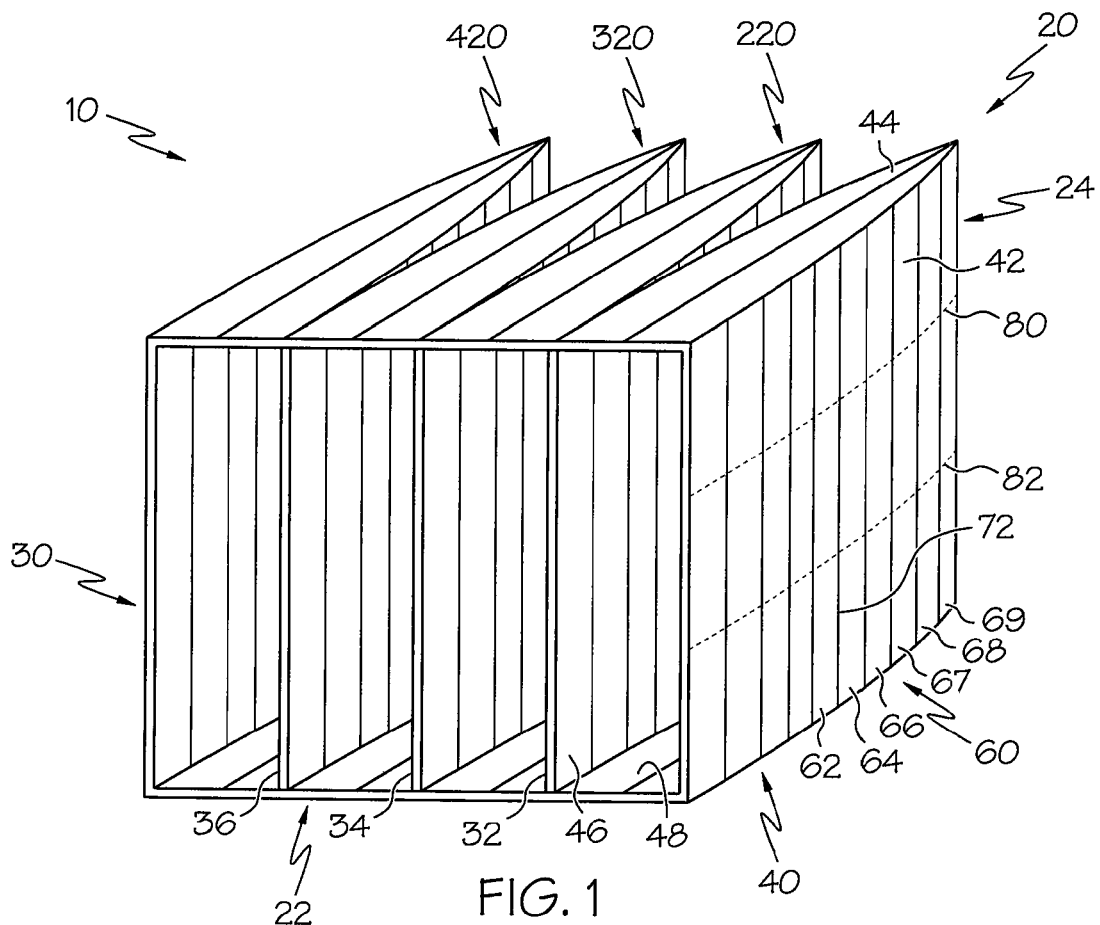
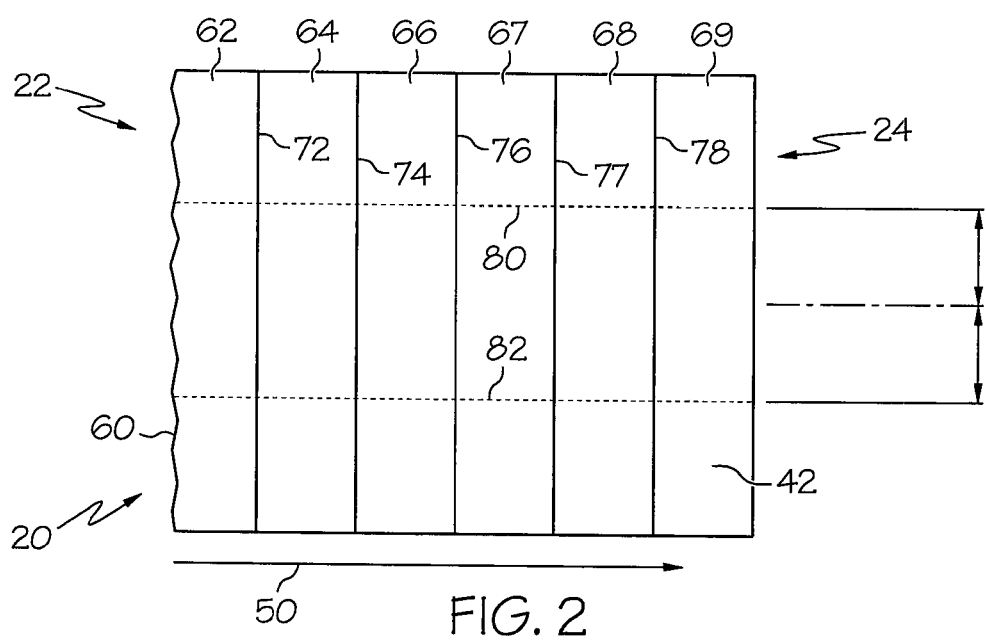

PLEATED WALLED BAG FILTERS FOR GAS TURBINE INLET SYSTEMS

BACKGROUND OF THE INVENTION

1. Field of the Invention

The invention relates generally to a filter, and more particularly to a filter bag structure that includes a plurality of pleats.

2. Discussion of Prior Art

Filter elements may be used to provide clean fluid, such as air, to or from various devices. Such devices may include gas turbines. Filter elements may include a filter bag structure. As fluid passes through the filter bags, dust and other particles are captured on the surfaces of the media of the filter bags. The airflow rate through filter bags can be higher than desired. The filter bags can also have a higher differential pressure loss than desired. Higher airflow rates and a higher differential pressure loss for the filter can result in the entrapment of less dust and shorter filter lives as well as reduced filtration efficiency. There are benefits for continual improvements in filter technologies so as to address these and other issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a filter bag assembly that includes a filter bag. The filter bag includes at least two sidewalls of filter material spaced from each other at an open end of the filter bag assembly and connected to provide a closed end of the filter bag assembly. At least one of the sidewalls includes at least one folded pleat.

In accordance with another aspect, the present invention provides a filter bag assembly having an open end and a closed end. The filter bag assembly includes at least one sidewall formed of a filter material extending in a direction from the open end to the closed end. At least one folded pleat is located on the at least one sidewall and a fold line of the at least one folded pleat extends perpendicular relative to the direction extending from the open end to the closed end.

In accordance with another aspect, the present invention provides a method of providing a filter bag assembly. The method includes providing at least two sidewalls of filter material and spacing the at least two sidewalls from each other at an open end of the filter bag assembly. The method includes providing that the at least two sidewalls are connected to form a closed end of the filter bag assembly. The method includes providing at least one folded pleat in at least one of the sidewalls.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 1 is a perspective view of a first example filter bag assembly that includes an aspect in accordance with the present invention;

FIG. 2 is a partial, schematic side view of the filter bag assembly of FIG. 1.

DETAILED DESCRIPTION OF THE INVENTION

Figure 3:
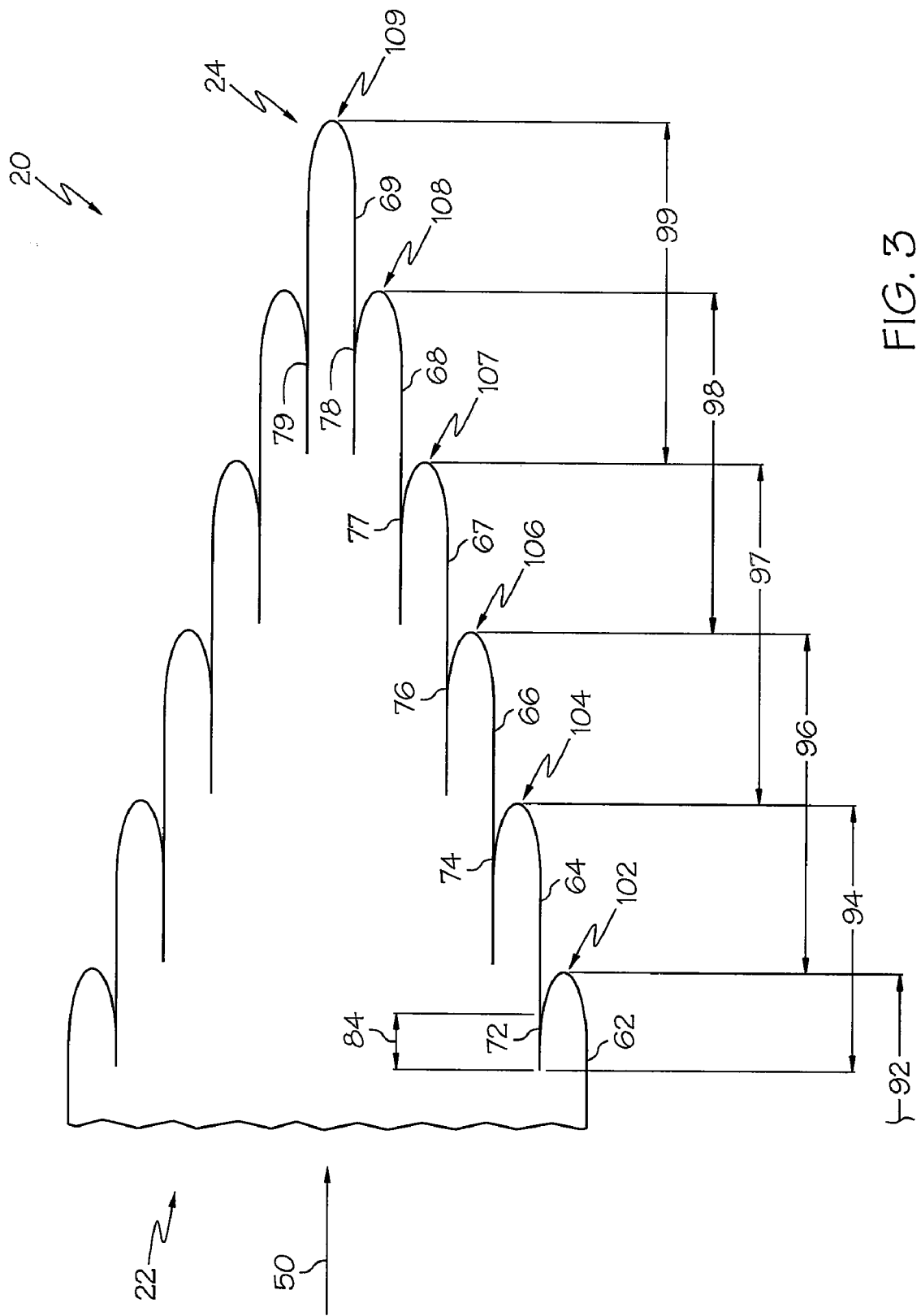
FIG. 3 is a schematic plan view of the filter bag assembly of FIG. 1 that shows an example orientation for a plurality of pleats.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example filter bag assembly 10 for a filtration system and that includes at least one aspect of the present invention is shown in FIG. 1. It is to be appreciated that the overall filtration system is not a limitation upon the present invention and thus the overall filtration system is not shown. Only the example filter bag assembly 10 is shown. Accordingly, the example filter bag assembly may be utilized within a variety of filter system arrangements and/or for a variety of applications.

The filter bag assembly 10 includes at least one filter bag 20. The at least one filter bag 20 of the filter bag assembly 10 includes an open end 22 and a closed end 24. Fluid flows through the filter bag assembly 10 generally along a direction 50 and is filtered. Specifically, the fluid is received at the open end 22 and proceeds along the direction 50 toward the closed end 24. It is to be appreciated that the specific fluid being filtered is not a limitation upon the present invention. The fluid can be liquid, air, or gas supplied to the filtration system.

The filter bag assembly 10 can include any number of filter bags including just a single filter bag. For example, the filter bag assembly 10 can include one filter bag, two filter bags, three filter bags, four filter bags, etc. In the shown example, a first filter bag 20, a second filter bag 220, a third filter bag 320, and a fourth filter bag 420 are provided. Each filter bag 20, 220, 320, 420 can have any type of geometry of shape including, but not limited to, the shapes shown in FIG. 1. In the shown example, the four filter bags 20, 220, 320, 440 are generally similar. As such most of the description herein in focused upon the first filter bag 20 with an understanding that similar structures and functions are present for the other filter bags 220, 320, 420. It is contemplated that the four filter bags 20, 220, 320, 440 have differences. As such it is to be understood that examples with differing filter bags are still within the scope of the present invention and that the present example is not an indication of the complete scope of the invention.

The example filter bag assembly 10 of FIG. 1 can be used in a bag house with a plurality of filters for filtering particles (e.g., dust) and other particulate materials from a gaseous, fluid exhaust such as a combustion system or a gas turbine. The bag house can support a plurality of filter bag assemblies. The example filter bag assembly 10 can also be used as a pre-filter or as a final filter. The type of dust/particulate matter/etc. that is filtered may be varied and is not a limitation upon the present invention.

As shown in the example of FIG. 1, the filter bag assembly 10 includes a frame 30. The frame 30 can have a variety of shapes and configurations. The frame 30 can be formed from any number of members and can form any shape, including but not limited to the quadrilateral shown in FIG. 1. The frame 30 can be configured to receive any number of filter bags, including a single filter bag. Each open end 22 of the filter bag 20 is configured or shaped to fit the area bounded by the members of the frame 30. The members of the frame 30 receive an outer portion of a filter bag. It is to be appreciated that the members of the frame 30 can be constructed/configured to hold, retain, affix, etc. the outer portions of the filter bags. The frame 30 can also be configured to receive the first filter bag 20, the second filter bag 220, a third filter bag 320, and a fourth filter bag 420. The frame 30 can further include internal members 32, 34, 36 to assist in receiving the additional filter bags 220, 320, 420. In further examples, multiple filter bags can be provided with or without the presence of internal members 32, 34, 36. In one example, a single filter bag can be provided corresponding to the two areas bounded by the members 32, 34 of the frame 30 shown in FIG. 1 instead of having the filter bag 20 and the filter bag 220. In another example, more than one filter bag can be provided for each opening or area bounded by the members of the frame 30, such as multiple filter bags being used in place of the filter bag 20 shown in FIG. 1.

The filter bag 20 includes a plurality of sidewalls 40 formed of a filter material. The filter material can be formed from a variety of materials, such as fibers or a membrane, and can be formed by a variety of processes. Of course, one or more aspects of the filter material, such as material, construction, configuration, thickness, etc. can be varied. Such specifics are not limitations upon the scope of the present invention. The fluid is filtered by the filter material as it passes through the at least one sidewall 40. The fluid can have a variety of velocities as it passes through the at least one sidewall 40 such as between 2.5 m/s to 10 m/s, or more preferably 5 m/s.

Within the filter bag 20, it can be appreciated that the plurality of sidewalls 40 includes a first sidewall 42, a second sidewall 44, a third sidewall 46, and a fourth sidewall 48 for the shown example. As such, the filter bag 20 includes at least one sidewall (e.g., 42). Also, with the shown example it is to be appreciated that at least one sidewall (e.g., 42) extends generally along the direction 50 from the open end 22 to the closed end 24. In the shown example, at least two sidewalls (e.g., 42 and 46), and actually all four sidewalls 42-48, extend along the direction 50 from the open end 22 to the closed end 24.

The plurality of sidewalls 40 of the filter bag 20 can form a variety of shapes for the bag. In the example of FIG. 1, the first sidewall 42 is opposite the third sidewall 46 and the second sidewall 44 is opposite the fourth sidewall 48. The first sidewall 42 and the third sidewall 46 may have some curvature. In this example, the first sidewall 42 and the third sidewall 46 are spaced from each other at the open end 22 and connect to each other at the closed end 24. As such the first sidewall 42 and the third sidewall 46 converge to provide that the filter bag has a V-shape, though other configurations and geometries can be used. In the shown example, the first sidewall 42 and the third sidewall 46 connect directly to each other, but it should be appreciated that one or more additional sidewalls could be interposed to provide the connection between the first sidewall 42 and the third sidewall 46.

The second sidewall 44 and the fourth sidewall 48 can also have a curvature. In other examples, an additional sidewall can be provided between the first sidewall 42 and the third sidewall 46 about the closed end 24. In other examples, any of the filter bags 20, 220, 320, 420 can have a different number of sidewalls.

The first filter bag 20 of the filter bag assembly 10 includes at least one folded pleat 60 located on the at least one sidewall 40. Within the shown example, the at least one folded pleat 60 is provided as a plurality of pleats 60. Hereinafter, the phase plurality of pleats 60 is utilized, but it is to be appreciated that any number of pleats can be provided. As such the shown plurality of pleats 60 is but one example of at least one pleat.

In this example, the plurality of pleats 60 is shown along the first sidewall 42 though in other examples, any or all of the sidewalls 42, 44, 46, 48 can include a plurality of folded pleats 60 (e.g., at least one pleat). The plurality of pleats 60 can be formed by a portion of filter material being folded. The plurality of pleats 60 can have a variety of shapes and configurations including but not limited to a flat pleat, a planar pleat, a wavy pleat, a V-shaped pleat, a W-shaped pleat, or adjacent pleats that share a common segment. Each pleat can have a certain pitch and each pleat can have a certain depth. The pleats can have varying or constant pitches and depths. The plurality of pleats 60 extending transverse to the direction 50 extending from the open end 22 to the closed end 24 helps to increase the dust holding capacity of the filter assembly both by providing increased surface area and. The pleats 60 provide additional area amount of filter material being placed in contact with fluid to thus capture additional dust and/or particulate material. The increase in the media area of the filter also results in the media airflow rate being lowered. Therefore, this causes a reduction in the overall resistance to the flow of fluid. The overall resistance to the flow of fluid is also known as the differential pressure loss. The reduced differential pressure loss lowers the effort required by the gas turbine to move fluid and improves filtration efficiency.

The plurality of pleats 60 can include a first pleat 62 with a first fold line 72. The fold line 72 of the first pleat 62 extends transverse to the direction 50 extending from the open end 22 to the closed end 24. The fold line 72 that is transverse to the direction 50 extending from the open end 22 to the closed end 24 can extend at any angle relative to the direction 50 except at 0 degrees relative to the direction 50. In the example of FIG. 1, the fold line 72 is relatively perpendicular relative to the direction 50 extending from the open end 22 to the closed end 24. In this example, the fold line 72 is approximately vertical.

The plurality of pleats 60 can include the first pleat 62 and a second pleat 64. The first fold line 72 can separate the first pleat 62 from the second pleat 64. The plurality of pleats 60 that includes at least a first pleat 62 and a second pleat 64 is configured to provide up to about 99.6% filtration efficiency as measured in accordance with an ASHRAE 52.2 test method. Additional pleats can also be provided. In the examples shown, the first pleat 62, the second pleat 64, a third pleat 66, a fourth pleat 67, a fifth pleat 68, and a sixth pleat 69 are shown though varying numbers of pleats can be provided. FIG. 1 includes additional pleats which can include the same structure and features as described for the first pleat 62.

A variety of different directions can be provided that are extending from the open end 22 to the closed end 24. The first filter bag 20 can also include multiple segments with varying directions extending from the open end 22 to the closed end 24 depending on the shape of the filter bag 20. Accordingly, the fold line 72 is still transverse to the direction 50 extending from the open end 22 to the closed end 24. The direction 50 between the open end 22 and the closed end 24 can also coincide with a longitudinal axis of the filter bag assembly 10.

A partial side view of some of the pleats of the first filter bag 20 of FIG. 1 is shown in FIG. 2. In FIG. 2, the first fold line 72 is shown as well as a second fold line 74, a third fold line 76, a fourth fold line 77, a fifth fold line 78, and a sixth fold line 79. The fold lines 72, 74, 76, 77, 78, 79 correspond to each pleat 62, 64, 66, 67, 68, 69 that is provided. The first filter bag 20 can also include at least a first stitch line 80. The first stitch line 80 is configured to hold the plurality of pleats 60 in place such that the folding of the pleat does not fall apart. The first stitch line 80 can extend along the first sidewall 42 at any angle relative to each of the fold lines 72, 74, 76, 77, 78, 79. In this example, the first stitch line 80 extends perpendicular relative to each of the fold lines 72, 74, 76, 77, 78, 79. In another example, a second stitch line 82 can be provided that can be parallel to the first stitch line 80.

FIG. 3 is an example of a partial top view of the first filter bag 20 of FIG. 1 and FIG. 2 where pleats are shown for the first sidewall 42 and the third sidewall 46. Both the first pleat 62 and the second pleat 64 on the sidewall 42 can have an orientation such that a substantial portion of a depth of each pleat 62, 64 receives fluid along the direction 50 extending from the open end 22 to the closed end 24. Even as portions of the first sidewall 42 can be relatively parallel to the direction 50 extending from the open end 22 to the closed end 24, a first depth 92 of the first pleat 62 and a second depth 94 of the second pleat 64 can have orientations to receive fluid along the direction 50 extending from the open end 22 to the closed end 24. In a further example, the second fold line 74 can separate the second pleat 64 from the third pleat 66. The third peat 66 also can have an orientation such that a substantial portion of the third depth 96 of the pleat receives fluid along the direction 50 extending from the open end 22 to the closed end 24. In further examples, various entry shapes for the depth 92, 94, 96, 97, 98, 99 of each pleat 62, 64, 66, 67, 68, 69 can be provided to ensure that none of the pleats 62, 64, 66, 67, 68, 69 obstruct the airflow to the remaining or adjacent pleats.

In a further example shown in FIG. 3, the first pleat 62 and the second pleat 64 can at least partially overlay each other in a shingle-like manner. The overlay can result in the first pleat 62 and the second pleat 64 having a common portion 84 of substantial length. Alternatively, the overlay can result in the second pleat 64 extending from a portion of the first pleat 62. In the example of FIG. 3, six pleats are provided on an example first sidewall 42 of a filter bag. The first sidewall 42 can have a size of approximately 597 mm×597 mm. The first filter bag 20 can have a media area of approximately 5.8 m$^2$ as opposed to only 3.3 m$^2$ where there are no pleats. The dust holding capacity of the first filter bag 20 with plurality of pleats 60 was also shown in experiments to provide approximately 60% greater dust holding capacity.

In a further example of the pleats being oriented to overlay each other, the first pleat 62 can include a first bulge pocket 102 and the second pleat 64 includes a second bulge pocket 104. Each bulge pocket 102, 104 can refer to an end portion of the pleat 62, 64 that is furthest from the open end 22. Thus, the third pleat 66 can include a third bulge pocket 106, the fourth pleat 67 can include a fourth bulge pocket 107, the fifth pleat 68 can include a fifth bulge pocket 108, and the sixth pleat 69 can include a sixth bulge pocket 109. Accordingly, each of the pleats 62, 64, 66, 67, 68, 69 can include a corresponding bulge pocket 102, 104, 106, 107, 108, 109. When fluid is received by the first filter bag 20, the bulge pockets 102, 104, 106, 107, 108, 109 tend to be opened by the flow of fluid in the direction 50. Each bulge pocket 102, 104, 106, 107, 108, 109 can press against a side portion of another bulge pocket and each bulge pocket can press outwardly away from the side portion of another bulge pocket. By overlaying the pleats 62, 64, 66, 67, 68, 69 and allowing the fluid to press on side portions of the bulge pockets 102, 104, 106, 107, 108, 109, additional areas of filter material are opened and exposed to the fluid for filtering. Overlaying the pleats 62, 64, 66, 67, 68, 69 can result in an increased particulate (e.g., dust) capture/retention capacity as an additional amount of filter material is exposed to the fluid. Any of the additional filter bags 220, 320, 420 can include any of the structure described relative to the first filter bag 20.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:
1. A filter bag assembly including:
   a filter bag that includes at least four sidewalls of filter material extending from an open end of the filter bag assembly to a closed end of the filter bag assembly at which the sidewalls connect to close the filter bag assembly, two of the sidewalls of filter material being opposed to each other across the filter bag and being spaced from each other at the open end of the filter bag assembly,
   at least one sidewall of the two opposed sidewalls including at least one folded pleat, wherein the two opposed sidewalls are configured to provide a general V-shape.
2. A filter bag assembly according to claim 1, wherein the at least one sidewall, which includes at least one folded pleat, extends in a direction from the open end to the closed end, and the at least one folded pleat has a fold line extending transverse to the direction extending from the open end to the closed end.
3. A filter bag assembly according to claim 1, wherein the at least one sidewall, which includes at least one folded pleat, extends in a direction from the open end to the closed end, and the at least one folded pleat includes a bulge pocket of the filter bag filter material that is open toward the open end of the filter bag assembly.
4. A filter bag assembly according to claim 1, wherein the at least one folded pleat includes a first pleat and a second pleat, and the first pleat and the second pleat at least partially overlay each other in a shingle-like manner.
5. A filter bag assembly according to claim 1, further including a frame configured to receive the open end of the filter bag, the filter bag extends away from the frame to the closed end.
6. A filter bag assembly according to claim 1, wherein the filter material configured to provide up to about 99.6% filtration efficiency as measured in accordance with an ASHRAE 52.2 test method.
7. A filter bag assembly according to claim 1, wherein the fold line of the at least one folded pleat extends perpendicular relative to the direction extending from the open end to the closed end.
8. A filter bag assembly according to claim 1, wherein the at least one folded pleat has a depth that has an orientation to receive fluid along the direction extending from the open end to the closed end.
9. A filter bag assembly having an open end and a closed end, the filter bag assembly including:
   at least four sidewalls formed of a filter material extending in a direction from the open end to the closed end;
   at least one folded pleat located on at least one sidewall and with a fold line of the at least one folded pleat extending perpendicular relative to the direction extending from the open end to the closed end.
10. A filter bag assembly according to claim 9, wherein the at least one folded pleat includes at least a first pleat and a second pleat, and the first pleat and the second pleat at least partially overlay each other.

11. A filter bag assembly according to claim 9, further including a frame configured to receive the filter bag at the open end, the filter bag extends away from the frame to the closed end.

12. A filter bag assembly according to claim 9, wherein a dust holding capacity of the filter bag assembly is approximately 60% greater by providing the first pleat and the second pleat.

13. A filter bag assembly according to claim 9, wherein the filter material is configured to provide up to about 99.6% filtration efficiency as measured in accordance with an ASHRAE 52.2 test method.

14. A filter bag assembly accordingly to claim 9, further including:
- a first depth of the first pleat has an orientation to receive fluid along the direction extending from the open end to the closed end; and
- a second depth of the second pleat has an orientation to receive fluid along the direction extending from the open end to the closed end.

15. A method of providing a filter bag assembly, the method including:
- providing a filter bag that has at least four sidewalls of filter material extending from a open end of the filter bag assembly to a closed end of the filter bag assembly at which the sidewalls connect to close the filter bag assembly, with two of the sidewalls of filter material being opposed to each other across the filter bag;
- spacing the two opposed sidewalls from each other at the open end of the filter bag assembly; and
- providing at least one folded pleat in at least one of the opposed sidewalls;
- wherein the at least one opposed sidewall extends in a direction from the end to the closed end and the step of providing the at least one folded pleat includes providing the at least one folded pleat to have a fold line extending transverse to the direction extending from the open end to the closed end.

16. A method of providing a filter bag assembly according to claim 15, wherein the step of providing the at least one folded pleat includes providing the at least one folded pleat to includes a bulge pocket open toward the open end of the filter bag assembly.

17. A method of providing a filter bag assembly according to claim 15, wherein the step of providing the at least one folded pleat includes providing a first pleat and a second pleat, with the first pleat and the second pleat at least partially overlaying each other in a shingle-like manner.

18. A method of providing a filter bag assembly according to claim 15, wherein the step of providing the filter bag of filter material includes providing that the filter material is configured to provide up to about 99.6% filtration efficiency as measured in accordance with an ASHRAE 52.2 test method.

* * * * *